(12) United States Patent
Shibata

(10) Patent No.: US 6,668,453 B1
(45) Date of Patent: *Dec. 30, 2003

(54) METHOD FOR MANUFACTURING INK JET RECORDING HEAD

(75) Inventor: Makoto Shibata, Kawasaki (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/683,761

(22) Filed: Jul. 17, 1996

(30) Foreign Application Priority Data

Jul. 18, 1995 (JP) .............................. 7-181567

(51) Int. Cl.[7] .................................. B23P 15/00
(52) U.S. Cl. ...................... 29/890.1; 264/154
(58) Field of Search ................ 29/611, 890.1; 347/45, 65; 264/154, 272.11, 272.18; 216/27

(56) References Cited

U.S. PATENT DOCUMENTS 4,686,544 A   8/1987   Ikeda et al. ............. 346/140 R
5,498,306 A   3/1996   Shibata et al. ........... 156/275.3

*Primary Examiner*—P. W. Echols
(74) *Attorney, Agent, or Firm*—Fitzpatrick, Cella, Harper & Scinto

(57) ABSTRACT

A method for manufacturing an ink jet recording head comprising a discharging orifice for discharging an ink, a discharge pressure generating element for generating energy for ink discharge, and an ink flow path communicating with the discharging orifice, said method comprising a step of preparing a first substrate provided with the discharge pressure generating element, a step of forming a removable pattern material for forming the ink flow path on the first substrate, a step of preparing a second substrate provided with an ink feed opening for feeding the ink to the ink flow papth, a step of fixing the first substrate and the second substrate with the interposition of a predetermined space via the pattern material, a step of injecting a resin for forming an ink flow path wall into a space between the first substrate and the second substrate, a step of curing the resin, a step of simultaneously cutting the first substrate, the second substrate and the cured resin to divide them into individual ink jet recording heads, and a step of removing the pattern material to form the ink flow path, wherein an injection opening is arranged in the vicinity of the portion for the ink flow path of the first substrate, and the resin is injected through the injection opening.

13 Claims, 4 Drawing Sheets

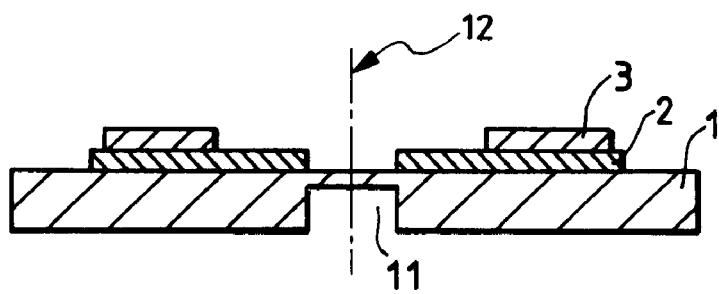
FIG. 3A
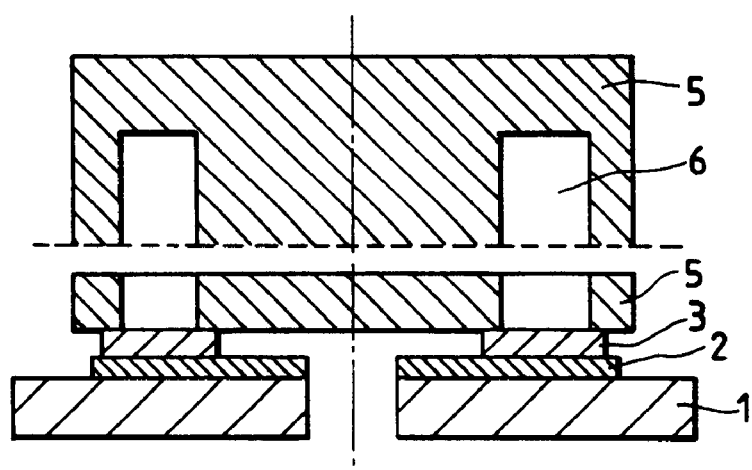
FIG. 3B
FIG. 3C
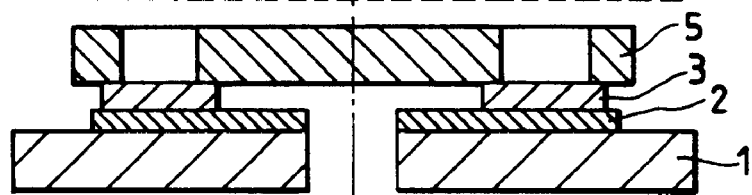
FIG. 3D
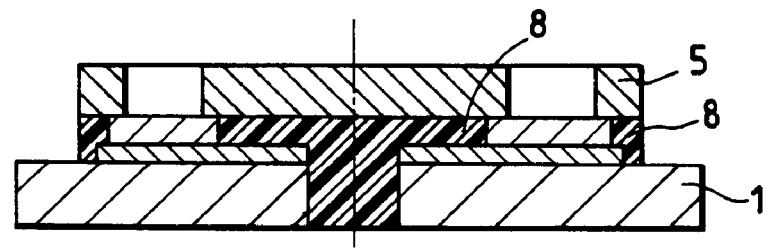
FIG. 3E
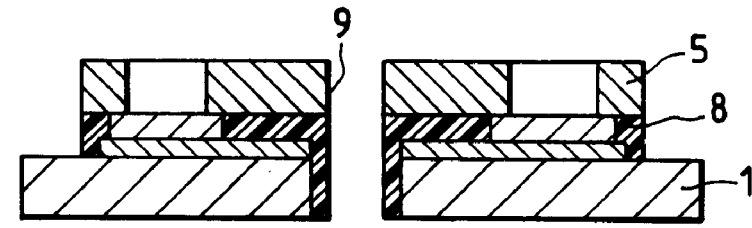
FIG. 3F
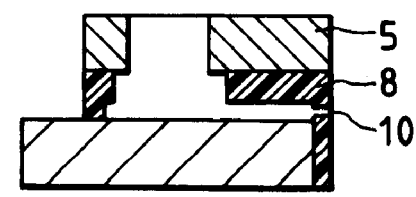

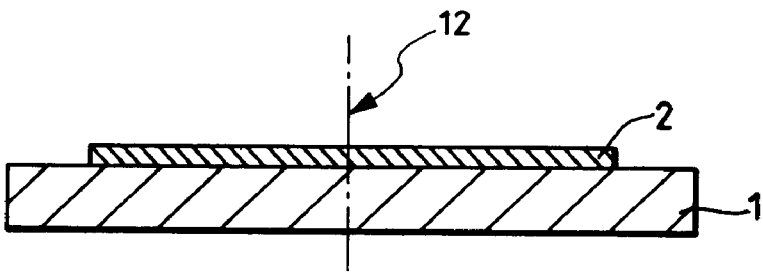
FIG. 4A
PRIOR ART
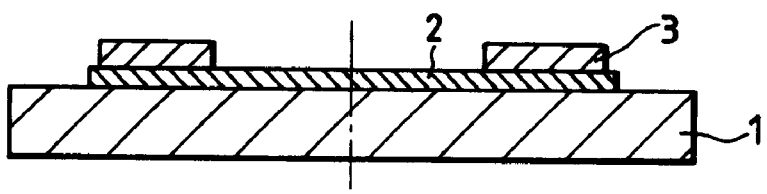
FIG. 4B
PRIOR ART
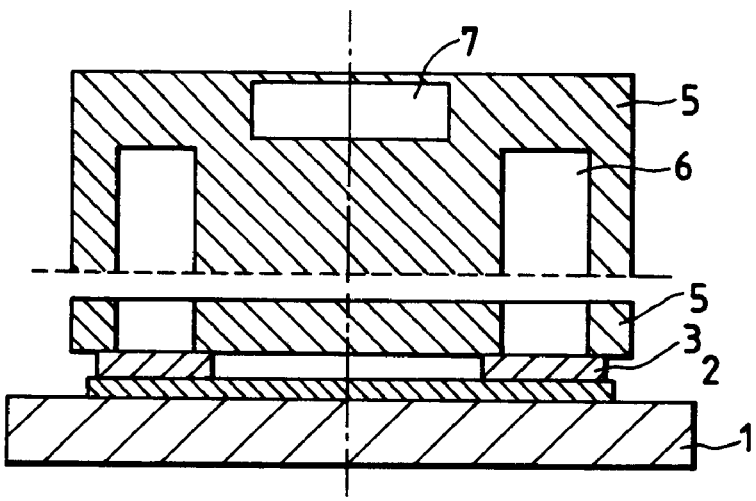
FIG. 4C
PRIOR ART
FIG. 4D
PRIOR ART
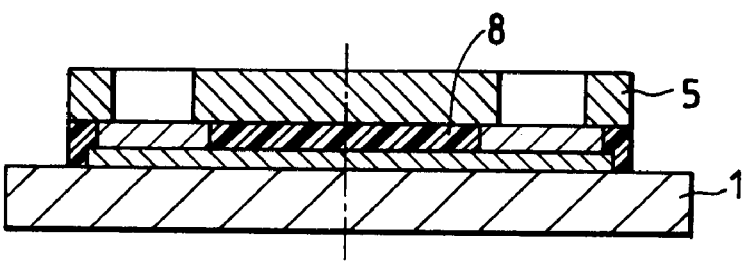
FIG. 4E
PRIOR ART
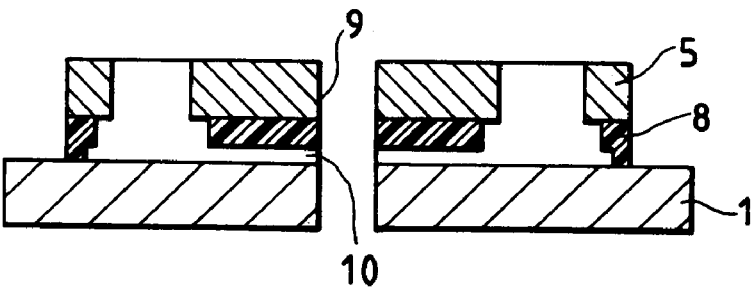
FIG. 4F
PRIOR ART

METHOD FOR MANUFACTURING INK JET RECORDING HEAD

BACKGROUND OF THE INVENTION

1. Field of the Invention

The present invention relates to a method for manufacturing an ink jet recording head for discharging an ink in an ink jet recording apparatus.

2. Related Background Art

The conventional manufacturing method (casting method) of a nozzle for this kind of ink jet recording head will be described. FIGS. 4A to 4F show illustrative sectional views (provided that, FIG. 4C is a plan view) of a conventional process. These figures show, respectively, (a) a state after the molding of a positive resist,
(b) a state after the molding of a liquid chamber printing agent (a printing agent for patterning a liquid chamber),
(c) the plan view of a top plate,
(d) a state after the fixing of the top plate,
(e) a state after the injection of a casting material, and
(f) a state after cutting and removal for the formation of discharging orifices.

According to a conventional casting method, a positive photoresist (a pattern material) 2 for forming an ink flow path (hereinafter referred to as "a nozzle" sometimes) is applied onto a heater board substrate 1 which is a first substrate provided with an electro-thermal converting element (not shown) as a discharge pressure generating element, followed by exposure and development to form the pattern of the nozzle (FIG. 4A). Afterward, a pattern material (a printing material) 3 for a portion which will be an ink liquid chamber is formed by screen printing or the like so as to be higher than the height of the nozzle (FIG. 4B).

Next, a top plate 5, as a second substrate, made of a glass plate or the like and provided with an ink feed opening 6 and an injection opening 7 for feeding a casting resin 8 referred to hereinafter is fixed on the heater board substrate 1, the pattern material 3 for the ink liquid chamber being used as a spacer (FIGS. 4C and 4D), and the casting resin 8 which will become a nozzle wall is then injected through the injection opening 7 for the casting resin 8 (FIG. 4E).

Furthermore, in order to form a discharge orifice 10, the heater board substrate 1 provided with a heating resistor, the resist having a nozzle shape, the wall of the nozzle, the resin forming a ceiling, and the glass plate covering the upper surface are simultaneously cut by a dicer in a usual manner. Reference numeral 12 shows the center line of cutting.

Lastly, the resist forming the nozzle is removed with an etchant such as NaOH to form the nozzle (FIG. 4F). This method has some advantages. For example, the nozzle can be formed in the state of a high density, and the shape of the respective nozzles can be made uniform.

However, with regard to the position where the injection opening 7 is formed through the glass plate or the like in accordance with this manufacturing method, the following problem exits. That is to say, in order to inject the casting resin 8 without generating air bubbles on the portion of the nozzle wall, the resin 8 is preferably allowed to flow into the liquid chamber through the nozzle portion, and the injection opening 7 is located in the vicinity of the nozzle (this way, even if some air bubbles get into the wall portion of the liquid chamber, the performance does not deteriorate because of ink leakage).

For the installation of the injection opening 7, the following two positions can be contrived.

(1) The case where the injection opening 7 is formed in the top plate 5 above the discharge orifice 10.

In order to easily inject the resin 8, the width of the injection opening 7 is required to be at least about 1 mm, but if it is attempted to increase the number of the recording heads in the first substrate 1 to decrease the heads', the injection opening 7 is excessively close to the ink feed opening 6, so that it is difficult from the viewpoint of strength to form the top plate 5, with the result that the manufacturing yield of the top plates 5 deteriorates.

In this connection, the distance from the face of the discharge orifice 10 to the liquid chamber is 0.5 mm or less, and in order not to lower the number of the recording heads, a cut width of 0.5 mm is necessary. In this case, however, the distance from the center line 12 of the cut portion to the hole of the ink feed opening 6 is at most about 1 mm, and hence it is substantially difficult to form the injection opening 7 within this distance.

(2) The case where the injection opening 7 is formed in the side of the nozzle portion at the side of the top plate 5.

In this case, if the resin 8 is injected through one side of the nozzle, it takes a long time from the start to the end of resin injection, due to the viscosity of the resin. Productivity becomes extremely reduced in the case of forming a full multiple recording head having many nozzles. If the resin 8 is injected through both the sides of the nozzle portion, the resin flowing from both sides meet at the central portion of the nozzle portion, and at this position, air bubbles are likely to be found.

SUMMARY OF THE INVENTION

The present invention has been accomplished with the intention of solving the problems of conventional manufacturing methods described above, and an object of the present invention is to provide an ink jet recording head having the improved stability of ink discharge and a high reliability for a long period of time. Another object of the present invention is to provide a method for manufacturing the ink jet recording head at a relatively low cost.

Thus, according to the present invention, there is provided a method for manufacturing an ink jet recording head comprising a discharging orifice for discharging an ink, a discharge pressure generating element for generating energy for ink discharge, and an ink flow path communicating with the discharging orifice, the method comprising:

a step of preparing a first substrate provided with the discharge pressure generating element, a step of forming a removable pattern material for forming the ink flow path on the first substrate, a step of preparing a second substrate provided with an ink feed opening for feeding the ink to the ink flow path, a step of fixing the first substrate and the second substrate with the interposition of a predetermined space via the pattern material, a step of injecting a resin for forming an ink flow path wall into a space between the first substrate and the second substrate, a step of curing the resin, a step of simultaneously cutting the first substrate, the second substrate and the cured resin to divide them into individual ink jet recording heads, and a step of removing the pattern material to form the ink flow path, wherein an injection opening is arranged in the vicinity of the portion for forming the ink flow path of the first substrate, and the resin is injected through the injection opening.

The employment of this method enables the achievement of the above-mentioned object.

With regard to the method for manufacturing the ink jet recording head according to the present invention, a through-opening for resin injection is preferably formed through the first substrate after the pattern material is formed on the first substrate.

With regard to the method for manufacturing the ink jet recording head according to the present invention, before the step of dividing the first and second substrates to form the individual recording heads, preferably a groove which does not go through the first substrate is formed from the back surface of the first substrate in a portion for the discharging orifice formable by the cutting, the pattern material is formed, the groove is bored through, and a resin injection opening is formed.

With regard to the method for manufacturing the ink jet recording head according to the present invention, in the step of cutting the first and second substrates to form the discharging orifice, it is preferable for a cut margin that is removed by cutting to be formed so that the width of the cut margin may be narrower than the width of the resin injection opening. This way, of the resin filled through the injection opening is exposed at the discharge orifice face.

With regard to the method for manufacturing the ink jet recording head according to the present invention, it is preferable that the pattern material is formed so as to project from a position to be cut for the formation of the discharging orifice, and the thus formed pattern material is exposed to the discharge orifice face by the cutting.

With regard to the method for manufacturing the ink jet recording head according to the present invention, it is preferable that the pattern material is formed so as to retract from a position to be cut for the formation of the discharging orifice, the thus formed pattern material is exposed to the discharge orifice face by the cutting, and afterward, the discharge orifice is formed by processing from the discharge orifice face.

As described above, according to the method for manufacturing the recording head regarding the present invention, the precision of the top plate can be improved and a time for resin injection can be shortened at a relatively low cost, which leads to the improvement of the yield of the recording head. Moreover, by selecting a suitable cutting tool, the choice of a substrate material and a resin material can be expanded, and in addition, a print quality can be improved.

BRIEF DESCRIPTION OF THE DRAWINGS

FIGS. 3A to 3F are sectional views illustrating the process of Example 3.

FIGS. 4A to 4F are sectional views illustrating a conventional process.

DESCRIPTION OF THE PREFERRED EMBODIMENTS

Next, the present invention will be described with reference to the following examples.

EXAMPLE 1

Figure 1A:
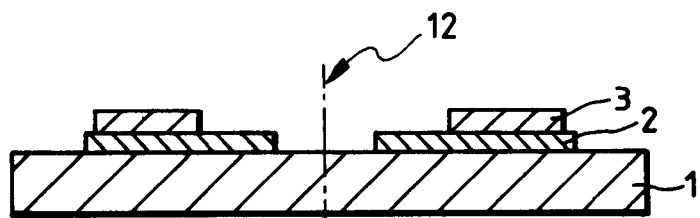
FIGS. 1A to 1G are sectional views illustrating the process of Example 1.
Figure 1B:
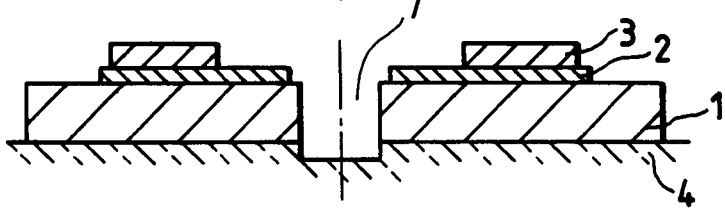
Figure 1C:
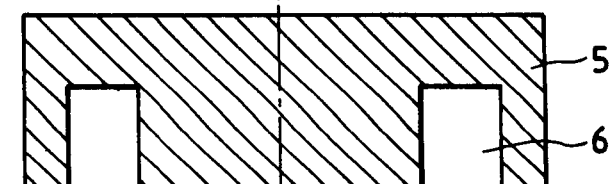
Figure 1D:
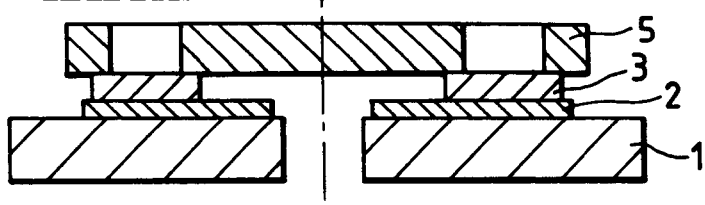
Figure 1E:
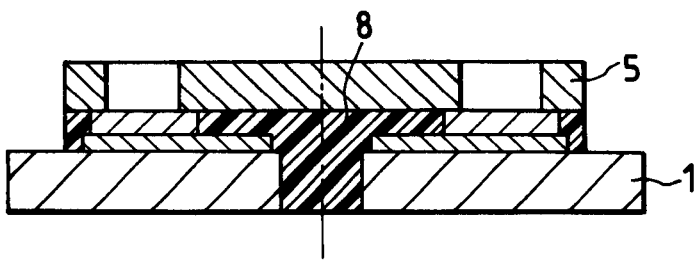
Figure 1F:
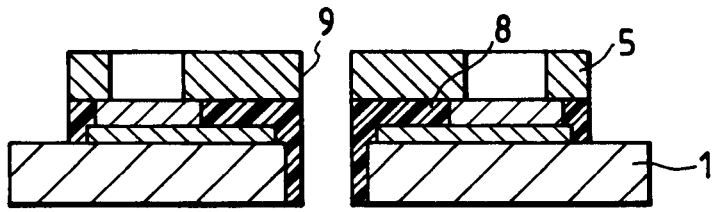
Figure 1G:
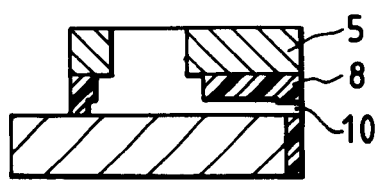

FIGS. 1A to 1G show sectional views illustrating the process of Example 1 according to the present invention (provided that, FIG. 1C is a plan view). Concretely, FIG. 1A shows a state after the molding of a liquid chamber printing agent, FIG. 1B shows a state after formation of an injection opening, FIG. 1C shows the plan view of a top plate, FIG. 1D shows a state after the top plate is fixed, FIG. 1E shows a state after the injection of a casting material, FIG. 1F shows a state after the cutting for the formation of discharge orifices, and FIG. 1G shows a state after the formation of the discharge orifices by making a hole.

In the first place, a heating resistor layer of $HfB_2$ having a thickness of 0.1 $\mu$m was formed by sputtering on a single-crystalline Si substrate 1 having a thickness of 2.5 $\mu$m and a size of 5 inches which had been subjected to thermal oxidation. Afterward, an electrode layer of Al having a thickness of 0.6 $\mu$m was formed.

Next, a resist (trade name OFPA-800, made by Tokyo Ouka Co., Ltd.) was applied, and exposure and development were then carried out to pattern this resist. The patterned resist was used as a mask, the heating resistor layer and the electrode layer were etched (i.e., the Al layer was etched with a trade name C-6 etching solution made by Tokyo Ouka Co., Ltd., and the $HfB_2$ layer was etched with a mixed solution of HF and $HNO_3$), whereby a heating element group comprising 512 heating resistors each having a width of 25 $\mu$m and a length of 100 $\mu$m was formed in one head.

Next, an $SiO_2$ layer having a thickness of 1.0 $\mu$m was formed as a first protective layer by sputtering, and a Ta layer having a thickness of 0.5 $\mu$m was further formed as a second protective layer.

Next, a resist (trade name OFPA-800, made by made by Tokyo Ouka Co., Ltd.) was applied onto the second protective layer, and this resist was then patterned by exposure and development. Afterward, rectangular patterns each covering the heating resistors were formed by etching. This etching was carried out by reactive ion etching in which $CF_4$ was used as an etching gas.

Next, as in the case of the second protective layer, the first protective layer was etched by the use of a photolithography technique to form a through-hole so that a voltage could be applied to the electrodes and the heating resistors.

In consequence, a heater board substrate 1 on which the heating resistor elements were formed was completed (FIG. 1A).

Next, positive resists 2 (trade name PMER-AR900, made by Tokyo Ouka Co., Ltd.) having a thickness of 35 $\mu$m were applied onto the heater board substrate 1, and nozzles parts and a liquid chamber part were formed by the use of a photolithography technique. In order to obtain the sufficient height of the liquid chamber part, a printing agent 3 (trade name MA-830, made by Taiyo Ink Co., Ltd.) was patterned as thick as 150 $\mu$m on the resist of the liquid chamber part by screen printing. Afterward, the back surface of the substrate 1 was fixed on a glass plate 4 with a wax, and then the heater board substrate 1 and the glass plate 4 located at the tip portion of the nozzle (which nozzle finally becomes a discharging orifice) were cut to a depth such that the glass plate 4 are not be separated. Cutting is performed using a dicer equipped with a blade having a thickness of 1 mm. Then the heater board substrate 1 is separated (FIG. 1B).

Next, a glass top plate 5 provided with ink feed openings 6 was positioned to the heater board substrate 1, and they were then fixed to each other with an instantaneous adhesive (Aronalpha). Afterward, the glass plate 4 was separated from the back surface of the substrate (FIGS. 1C and 1D). At this time, in the space between the heater board substrate 1 and the top plate 5, the resist 2 and the liquid chamber printing agent 3 played the role of a spacer.

Next, a resin 8 as a casting material was injected through the through-opening of the heater board formed by the cutting and then cured (FIG. 1E). The obtained member was then cut by a dicer equipped with a blade having a thickness of 0.5 mm to form a discharge orifice face 9 (FIG. 1F). Reference numeral 12 shows the center line of cutting. Afterward, a water repellent (CTX) was applied onto the discharge orifice face 9. Then, a mask having a circular hole corresponding to the opening shape of a discharging orifice 10 was positioned by the nozzle filled with the positive resist, and the nozzle was then irradiated with an excimer laser through the circular hole in order to remove the resist that had filled the nozzle, thereby forming the discharging orifice 10 (FIG. 1G).

Next, the liquid chamber printing agent 3 and the positive nozzle pattern material 2 were removed with a 5% NaOH solution to complete a discharging element.

Lastly, the discharging element was allowed to adhere to a base plate, and the heating resistors were electrically connected to a driving element of the recording head. Afterward, an ink feed system was attached, thereby completing this recording head.

The periphery of the discharging orifice 10 of the thus manufactured recording head was covered with the resin 8 which is the same material, and the size of the respective discharging orifices 10 was also uniform. Therefore, the volume of the discharged ink and the direction of discharging the ink were stable, so that a good print quality could be obtained. Furthermore, since the top plate 5 was provided with the ink feed openings 6 alone, the formation of the top plate 5 was easy, and the injection step of the resin 8 could be carried out in a short period of time, so that a high yield could be obtained.

Example 2

Figure 2A:
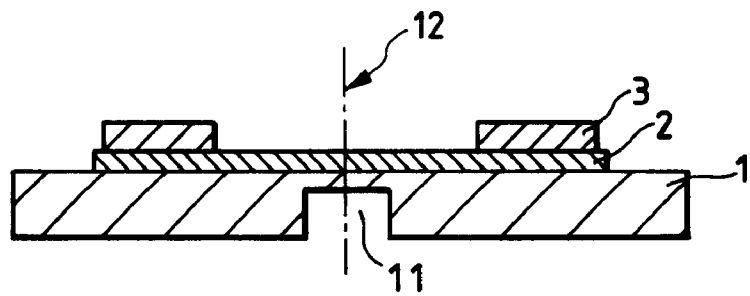
FIGS. 2A to 2E are sectional views illustrating the process of Example 2.
Figure 2B:
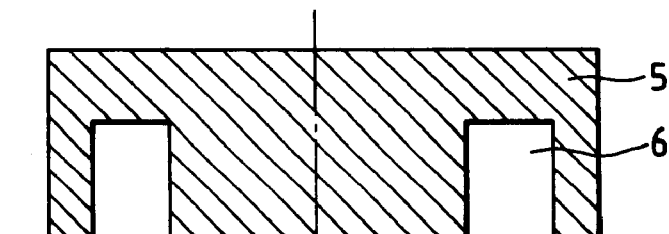
Figure 2C:
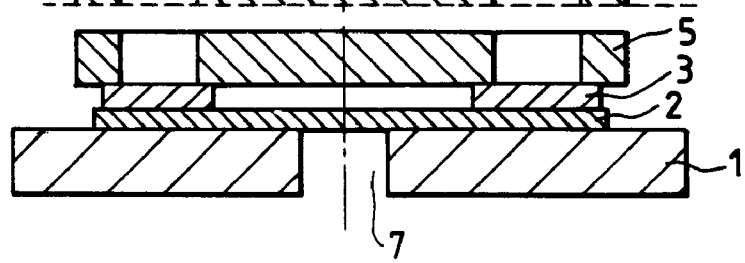
Figure 2D:
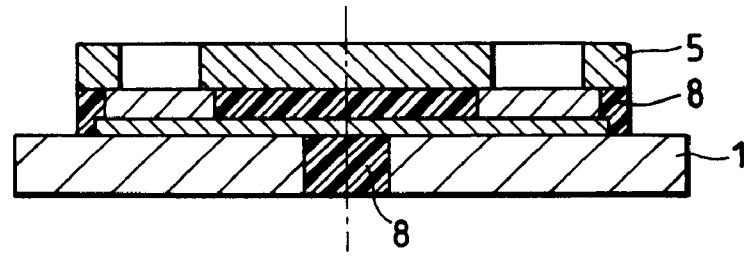
Figure 2E:
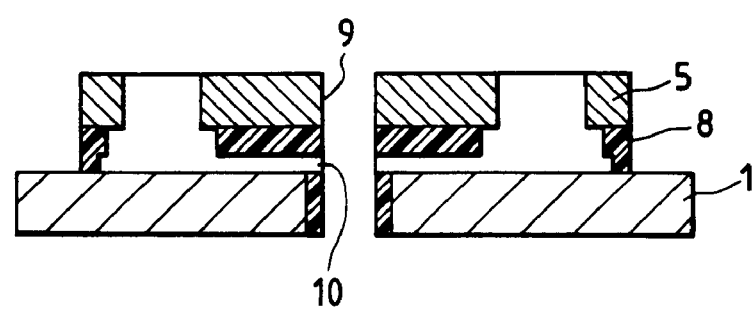

Next, as Example 2, a recording head was manufactured in accordance with the respective steps shown in FIGS. 2A to 2E (these figures are sectional views provided that FIG. 2B was a plan view). Concretely, FIG. 2A shows a state after the molding of a liquid chamber printing agent, FIG. 2B shows a plan view of a top plate, FIG. 2C shows a state after the top plate is fixed, FIG. 2D shows a state after the injection of a casting material, and FIG. 2E shows a state after cutting and removal for the formation of discharge orifices.

In the first place, an Al substrate 1 having a thickness of 2 mm and a size of 5 inches was prepared by mirror surface cutting, and at two optional positions of the substrate 1, cutouts were formed. On the basis of these cutouts, a groove 11 having a depth of 1.5 mm was formed, by a diamond cutting tool having a width of 1 mm, on the back surface of the substrate 1 below a portion which finally becomes a discharging orifice 10. On the surface of the substrate 1, an $SiO_2$ film having a thickness of 2.5 $\mu$m was formed by sputtering.

The $SiO_2$ film was etched to remove a wider area of the $SiO_2$ film than the portion removed by the cutting for the formation of the discharging orifice 10. Afterward, a heater board 1, and pattern materials 2 and 3 for nozzles and a liquid chamber were formed in the same manner as in FIGS. 1A to 1G. Furthermore, for the positioning of the surface pattern to the groove of the back surface, the above-mentioned cutouts were utilized (FIG. 2A).

Next, a glass top plate 5 provided with ink feed openings 6 was positioned to the heater board substrate 1, and they were then fixed with an instantaneous adhesive in the same manner as in Example 1. Afterward, the back surface of the substrate 1 was etched with the etchant C-6 for Al to bore through the groove (FIGS. 2B to 2C).

In order to bore through the substrate at a through-opening, only an Al layer film should not be present. At this time, the nozzle pattern materials are not etched, and therefore they are held in a state in which they project from the edge of the through-opening. In addition, since the whole back surface of the substrate is etched, it is preferable that a resist such as a wax be applied onto the entire back surface of the substrate, save at the groove.

A resin 8 was injected through the thus formed through-opening of the substrate 1 formed as just described, and the this resin is cured. The resulting member was then cut by a dicer equipped with a blade having a thickness of 0.5 mm to form a discharge orifice face 9 from which a discharging orifice 10 filled with a positive resist was exposed. Afterward, a liquid chamber printing agent 3 and the nozzle pattern material 2 were removed with a 5% NaOH solution, and water repellent (CTX+KP-801) was transferred to the discharge orifice face 9, thereby completing a discharging element (FIG. 2E).

Afterward, the same procedure as in Example 1 was carried out to complete this recording head.

According to the thus manufactured recording head, the same effect as in Example 1 (FIGS. 1A to 1G) was obtained. Incidentally, if Al is exposed at a portion which comes in contact with an ink, a long-term reliability is probably decreased by corrosion or the like, and therefore a certain treatment for coating Al (e.g., the anodizing of Al) is necessary.

Example 3

Next, as Example 3, a recording head was manufactured in accordance with the respective steps shown in FIGS. 3A to 3F (these figures are sectional view, provided that FIG. 3B is a plan view). Concretely, FIG. 3A shows a state after the molding of a liquid chamber printing agent, FIG. 3B shows a plan view of a top plate, FIG. 3C shows a state after the top plate is fixed, FIG. 3D shows a state after the injection of a casting material, FIG. 3E shows a state after cutting for the formation of discharge orifices, and FIG. 3F shows a state after the formation of the discharge orifices.

In Example 3, operation proceeded until a cutting step for forming discharging orifices (FIG. 3E) in the same manner as in Example 2 (FIGS. 2A to 2E), but the nozzle pattern of a positive resist 2 was stopped before a part to be removed by the cutting for formation of a discharging orifice 10. The subsequent step was advanced in accordance with the procedure of Example 1 (FIGS. 1A to 1G), and the discharging orifice 10 was formed by an excimer laser.

According to the thus manufactured recording head, the same effect as in Example 1 was obtained.

As described above, by a method for manufacturing a recording head according to the present invention, a portion in which high precision is required in the processing of a top plate is an ink feed opening alone. Therefore, a processing yield can be improved, and even in the step of injecting a casting resin, the injection can be carried out in a short period of time, and therefore the high yield can be expected.

In conventional methods, with regard to the selection of cutting blades for the prevention of chipping of the periphery of discharging orifices at the cutting for formation of the discharging orifices, the blades suitable for the cutting of both of a substrate material and the resin are required to be selected. However, the periphery of the discharging orifices of the thus manufactured head according to the present invention is covered with the resin which is the same material, and therefore a cutting tool which is suitable for the resin alone can be selected in the manufacturing method of the present invention. In consequence, the choice of the above-mentioned material can be expanded.

Furthermore, there is no fear that air bubbles are generated in an ink flow path, so that highly precise nozzles can be formed. In addition, the size of the respective discharging orifices is also uniform, so that a discharging direction and the volume of the discharged ink are stable. In consequence, a good print quality can be obtained.

What is claimed is:

1. A method for manufacturing an ink jet recording head comprising a discharging orifice for discharging an ink located in a discharge opening face, a discharge pressure generating element for generating energy for ink discharge, an ink flow path communicating with the discharging orifice and a liquid chamber communicating with the ink flow path, such that there is a liquid chamber side of the ink flow path, said method comprising:

a step of preparing a first substrate provided with the discharge pressure generating element, a step of forming a removable pattern material for forming the ink flow path on the first substrate, a step of preparing a second substrate provided with an ink feed opening for feeding the ink to the ink flow path, a step of fixing the first substrate and the second substrate with the interposition of a predetermined space via the pattern material, a step of injecting a resin for forming an ink flow path wall into a space between the first substrate and the second substrate, a step of curing the resin, a step of simultaneously cutting the first substrate, the second substrate and the cured resin to divide them into individual ink jet recording heads, and a step of removing the pattern material to form the ink flow path, wherein an injection opening is arranged in the vicinity of the portion for the ink flow path of the first substrate, and the resin is injected through the injection opening toward the liquid chamber side of the ink flow path, and the injection opening is a through-hole for resin injection that is formed through the first substrate after the pattern material is formed on the first substrate.

2. The method for manufacturing an ink jet recording head according to claim 1, wherein the pattern material is formed so as to extend inward from a position that is to be cut to form the discharge opening face, the thus formed pattern material is exposed on the discharge orifice face by the cutting, and the discharge orifice is formed by processing inward from the discharge orifice face.

3. The method for manufacturing an ink jet recording head according to claim 1, further comprising, before the step of cutting the first and second substrates to form the respective recording heads, forming a groove which does not go completely through the first substrate at a portion of the pattern material where the discharging orifice is located by cutting from the back surface of the first substrate and then enlarging the groove through the first substrate so that a resin injection opening is formed.

4. The method for manufacturing an ink jet recording head according to claim 3, wherein the pattern material is formed so as to project from a position to be cut for the formation of the discharging orifice, and the thus formed pattern material is exposed on the discharge orifice face by the cutting.

5. The method for manufacturing an ink jet recording head according to claim 3, wherein the pattern material is formed so as to extend inward from a position to be cut to form the discharge orifice face, the thus formed pattern material is exposed on the discharge orifice face by the cutting, and the discharge orifice is formed by processing inward from the discharge orifice face.

6. The method for manufacturing an ink jet recording head according to claim 1, wherein in the step of simultaneously cutting the first and second substrates to form the discharge opening face in which will be located the discharging orifice, a portion of material which is removed by the simultaneously cutting is narrower than the width of the resin injection opening, so that a portion of the resin remains and a part of the resin filled in the injection opening is exposed on the discharge orifice face.

7. A method for manufacturing an ink jet recording head comprising a discharging orifice for discharging ink located in a discharge opening face, a discharge pressure generating element for generating energy for ink discharge, an ink flow path communicating with the discharging orifice and a liquid chamber communicating with the ink flow path, such that the liquid chamber is provided at the other end of the ink flow path than an end of the ink flow path at which the ink flow path communicates with the discharging orifice, said method comprising:

a step of preparing a first substrate provided with the discharge pressure generating element, a step of forming a removable pattern material for forming the ink flow path on the first substrate, the removable pattern material forming a pattern in which at least two ink jet recording heads are contiguous in opposition to each other on the side of the ink flow path thereof, a step of preparing a second substrate provided with an ink feed opening for feeding ink to the ink flow path, a step of fixing the first substrate and the second substrate with the interposition of a predetermined space via the pattern material, a step of injecting a resin for forming an ink flow path wall into a space between the first substrate and the second substrate, a step of curing the resin, a step of simultaneously cutting the first substrate, the second substrate and the cured resin to divide them into individual ink jet recording heads, and a step of removing the pattern material to form the ink flow path, wherein an injection opening is provided in the vicinity of the continuous portion of the pattern of the removable pattern material of the first substrate, and the resin is injected through the injection opening toward the liquid chamber side of the ink flow path, and the injection opening is a through-hole for resin injection that is formed through the first substrate after the pattern material is formed on the first substrate.

8. The method for manufacturing an ink jet recording head according to claim 7, further comprising, before the step of cutting the first and second substrates to form the respective recording heads, forming a groove which does not go completely through the first substrate at a portion of the pattern material where the discharging orifice is located by cutting from the back surface of the first substrate and then enlarging the groove through the first substrate so that a resin injection opening is formed.

9. The method for manufacturing an ink jet recording head according to claim 8, wherein the pattern material is formed so as to project from a position to be cut for the formation of the discharging orifice, and the thus formed pattern material is exposed on the discharge orifice face by the cutting.

10. The method for manufacturing an ink jet recording head according to claim 8, wherein the pattern material is formed so as to extend inward from a position to be cut to form the discharge orifice face, the thus formed pattern material is exposed on the discharge orifice face by the cutting, and the discharge orifice is formed by processing inward from the discharge orifice face.

11. The method for manufacturing an ink jet recording head according to claim 7, wherein in the step of simultaneously cutting the first and second substrates to form the discharge opening face in which will be located the discharging orifice, a portion of material which is removed by the simultaneously cutting is narrower than the width of the resin injection opening, so that a portion of the resin remains and a part of the resin filled in the injection opening is exposed on the discharge orifice face.

12. The method for manufacturing an ink jet recording head according to claim 7, wherein the pattern material is formed so as to extend inward from a position that is to be cut to form the discharge opening face, the thus formed pattern material is exposed on the discharge orifice face by the cutting, and the discharge orifice is formed by processing inward from the discharge orifice face.

13. A method for manufacturing an ink jet recording head comprising a discharging orifice for discharging ink located in a discharge opening face, a discharge pressure generating element for generating energy for ink discharge, an ink flow path communicating with the discharging orifice and a liquid chamber communicating with the ink flow path, such that the liquid chamber is provided at an other end of the ink flow path than an end of the ink flow path at which the ink flow path communicates with the discharging orifice, said method comprising the steps of:

preparing a first substrate;

forming a plurality of discharge pressure generating elements for constituting at least two ink jet recording heads on the first substrate and a removal pattern material covering the discharge pressure generating elements for forming the ink flow path and the liquid chamber such that the two ink jet recording heads are contiguous in opposition to each other on the side of the discharging orifice;

preparing a second substrate having a plurality of ink feed openings for feeding ink to the liquid chamber;

fixing the first substrate and the second substrate with the interposition of the removal pattern material to form a predetermined continuous space between the first substrate and the second substrate through the two ink jet recording heads;

injecting a resin into the space and curing the resin to form an ink flow wall;

cutting a stack comprising the first substrate, the second substrate and the ink flow wall at a boundary portion of the two ink jet recording heads to divide the two ink jet recording heads into individual ink jet recording heads; and removing the removal pattern material to form the ink flow path and form the discharging orifice at the cutting face side end portion of the ink flow path, wherein the first substrate or the second substrate has an injection opening communicating with the space at the boundary portion of the two ink jet recording heads, and wherein the injecting of the resin into the space is carried out from the injection opening in a direction of the liquid chamber of each ink jet recording head.

* * * * *

UNITED STATES PATENT AND TRADEMARK OFFICE
CERTIFICATE OF CORRECTION

PATENT NO. : 6,668,453 B1
DATED : December 30, 2003
INVENTOR(S) : Shibata

It is certified that error appears in the above-identified patent and that said Letters Patent is hereby corrected as shown below:

Title page,
Item [57], ABSTRACT,
Line 11, "papth," should read -- path, --.

Column 2,
Line 6, "heads'," should read -- heads' cost, --.

Column 4,
Line 29, "made by" (second occurrence) should be deleted.

Column 6,
Line 13, "the" should read -- then --; and
Line 37, "view," should read -- views, --.

Column 8,
Line 27, "the other" should read -- an --; and
Line 28, "than" should read -- other than --.

Column 9,
Line 39, "other" should be deleted.

Column 10,
Line 1, "than" should read -- other than --.

Signed and Sealed this

Twentieth Day of July, 2004

JON W. DUDAS
*Acting Director of the United States Patent and Trademark Office*